US012104781B2

(12) United States Patent
Smith et al.

(10) Patent No.: US 12,104,781 B2
(45) Date of Patent: Oct. 1, 2024

(54) LIGHT RUNG FOR KINETIC FACADE SYSTEM

(71) Applicant: EXTECH/EXTERIOR TECHNOLOGIES, INC., Pittsburgh, PA (US)

(72) Inventors: Kevin Smith, Glenshaw, PA (US); Franklin Krouse, Greensburg, PA (US)

(73) Assignee: Extech/Exterior Technologies, Inc., Pittsburgh, PA (US)

( * ) Notice: Subject to any disclaimer, the term of this patent is extended or adjusted under 35 U.S.C. 154(b) by 247 days.

(21) Appl. No.: 17/823,119

(22) Filed: Aug. 30, 2022

(65) Prior Publication Data

US 2023/0062998 A1 Mar. 2, 2023

Related U.S. Application Data

(60) Provisional application No. 63/238,263, filed on Aug. 30, 2021.

(51) Int. Cl.

| | |
|---|---|
| ***E04F 13/08*** | (2006.01) |
| ***E04B 1/344*** | (2006.01) |
| ***F21V 29/70*** | (2015.01) |
| ***F21V 33/00*** | (2006.01) |
| ***F21Y 115/10*** | (2016.01) |

(52) U.S. Cl.

CPC ............ *F21V 33/006* (2013.01); *E04B 1/344* (2013.01); *E04F 13/0871* (2013.01); *F21V 29/70* (2015.01); *F21Y 2115/10* (2016.08)

(58) Field of Classification Search

CPC ........... F21V 7/0083; F21V 7/05; F21V 14/04

See application file for complete search history.

(56) References Cited

U.S. PATENT DOCUMENTS 1,632,254 A * 6/1927 Vinogradov ............. F21S 11/00 353/3
2008/0074279 A1* 3/2008 Chiu ....................... F21V 14/04 340/815.45
2013/0039059 A1* 2/2013 Montgermont ........... E06B 3/66 362/235
2013/0250556 A1* 9/2013 Gordin .................... F21V 17/02 362/147
(Continued)

OTHER PUBLICATIONS

Photograph from Sochi winter olympics, circa Feb. 2014, obtainable online, www.google.com.
(Continued)

*Primary Examiner* — Eric T Eide

(74) *Attorney, Agent, or Firm* — McNees Wallace & Nurick

(57) ABSTRACT

A kinetic façade system visible at night which includes a plurality of flapping panels which move in response to wind, thereby providing an aesthetic, architectural exterior. The flappers are hung on rung subassemblies. The rungs overhang each other in a stacked vertical fashion about the face of a building, each rung including a housing. An LED is disposed within the rung housing positioned near the top thereof situated on a seat to direct light upward. As such, when the flapper elements situated above the light move, the flappers swing through the light at random intervals and at varying degrees in response to the environmental conditions, thereby creating an effect at night along the façade of the building.

20 Claims, 5 Drawing Sheets

(56) References Cited

U.S. PATENT DOCUMENTS

| | | | | |
|---|---|---|---|---|
| 2015/0082921 | A1 | 3/2015 | Posner | |
| 2017/0045204 | A1* | 2/2017 | McNicol et al. | F21V 14/04 |
| 2024/0048088 | A1* | 2/2024 | Kim | H02S 20/26 |

OTHER PUBLICATIONS

Posco ICT Company Ltd., System for Kinetic Wall, KIPO printout of patent registration No. 1020270510000, Sep. 24, 2019.
Extech/Exterior Technologies, Inc., Photograph of Pittsburgh's Children Museum, circa Aug. 2004, www.extechinc.com.
Extech/Exterior Technologies, Inc., internal photograph published as trademark specimen, circa Apr. 2017.

* cited by examiner

LIGHT RUNG FOR KINETIC FACADE SYSTEM

CROSS-REFERENCE TO RELATED APPLICATIONS

The present application claims benefit of provisional application Ser. No. 63/238,263, filed Aug. 30, 2021, the contents of which are herein incorporated by reference.

BACKGROUND

Field of the Invention

The present invention relates to components of kinetic façade systems, i.e. walls which have features that move in response to influences such as mechanical systems or the environment (wind) which therefore are aesthetically pleasing. More particularly, the instant component is a horizontal rung attached to a flapper mounting system which integrates linear light-emitting diodes (LEDs) to thereby project light upwards against the moving panels to create a wave of light effect.

Description of the Related Art

Kinetic façade systems are known in the art. For instance, the MegaFaces pavilion at the Sochi 2014 Winter Olympics used mechanically driven rods to mimic three-dimensional faces. KR20190092689 relates to a kinetic wall system which comprises: a fixing part fixing a kinetic wall; a support part protruding from the fixing part; a shaking part rotatably coupled to the support part to shake in one direction of the support part; and a shaking fixing part for fixing shaking of the shaking part. US 20150082921 to Posner teaches a robotic sign waver which has a chassis including a main plate which mounts a drive train. The drive train includes a motor and a gearbox coupled to the motor. The gearbox has an output shaft that drives a crank arm with a linkage rod attached thereto. The linkage rod drives a rocker plate that is mounted on the main plate for repetitive motion. An elongated waving arm is mounted on the rocker plate for repetitive motion with the rocker plate. The rocker plate is robust to withstand the stress and wear of repetitive motion while the waving arm is relatively light to minimize its load on the drive train. A counterweight is attached to the rocker plate on the opposite side of the main plate from the rocker plate by means of connectors extending through slots in the main plate. A reversible connector plate allows attachment of the chassis to either vertical or angled sign boards.

Walls having components which respond to environmental influences have also been developed. A kinetic wall designed by applicant Extech/Exterior Technologies, Inc. is a dynamic moving building façade that creates an eye-catching aesthetic, made of a plurality of flappers. The wall responds to wind currents and undulates to create the look of rolling waves. The wall is customizable and can be designed to accommodate square or curved polycarbonate, glass, aluminum, or steel flappers. The flapper elements can be dropped into framing systems or can be attached to stainless steel rods or be pin-mounted.

The kinetic "wave" effects of the wall traditionally can only be seen during daylight. If the façade of the building is at least partially lit, some flappers can be seen, but the full effects ofthe wall are lost. There is a need then for building façade elements which creates a kinetic effect visible at night.

SUMMARY

The present invention relates generally to a kinetic façade system, e.g. for buildings, which includes a plurality of flapping panels which move in response to wind, thereby providing an aesthetic, architectural exterior, the system's primary component being a rung comprising a horizontal, generally tubular housing which contains a light strip. The housing is adapted to attach to a frame structure and accompany the one or more aluminum horizontal extrusions onto which movable flappers are attached and adapted to swing. The housing is further anchored at each end to the frame by screws through bosses. An LED is disposed within the rung housing positioned near the top thereof situated on a seat to direct light upward. As such, when a plurality of flapper elements situated above the lightmove, the flappers swing through the light at random intervals and at varying degrees in response to the environmental conditions, thereby creating an effect at night along the façade of the building.

More particularly, the system comprises a rung, typically one or more, to make up a plurality of rungs overhanging each other in a stacked vertical fashion about the face of a building, each rung including a housing having an interior, a top, a rear wall and a front. An optional pin is inserted through the front. A flapper therefor is pivotably attached to the rung being held in place at the rung by the pin; and, a light-emitting diode (LED) is disposed within the interior of the housing proximate to the top, wherein the LED is configured to project light substantially upward. As such, the upward projecting light would hit an above-hanging flapper.

A screw boss is defined within the interior of the housing, the screw boss adapted to receive a screw trans-axial to the pin so that it can be fastened to a rail. The rung is attached to the rail such that the rung can be situated in a generally horizontal position within a frame; and, an extrusion is secured to an end of the rail with the screw, the extrusion having defined thereon a pocket. A wireway is disposed within the pocket; and, wiring is situated within the wireway with the wiring traveling along the frame up to connect to the LED.

Other components include; a cap for securement along the top over the LED; an extruded seat within the interior to situate the LED. A stop extends from the seat, the stop positioned to stop a pin end of the pin, and a curved profile cap can be attached to the rear wall of the rung for aesthetics.

Lastly, in an alternative embodiment, one or more arms, e.g. a pair, extend downward from the top within the interior of the rung, and a heat sink can be utilized between the pair of the arms.

DETAILED DESCRIPTION OF THE PREFERRED EMBODIMENT

Figure 1:
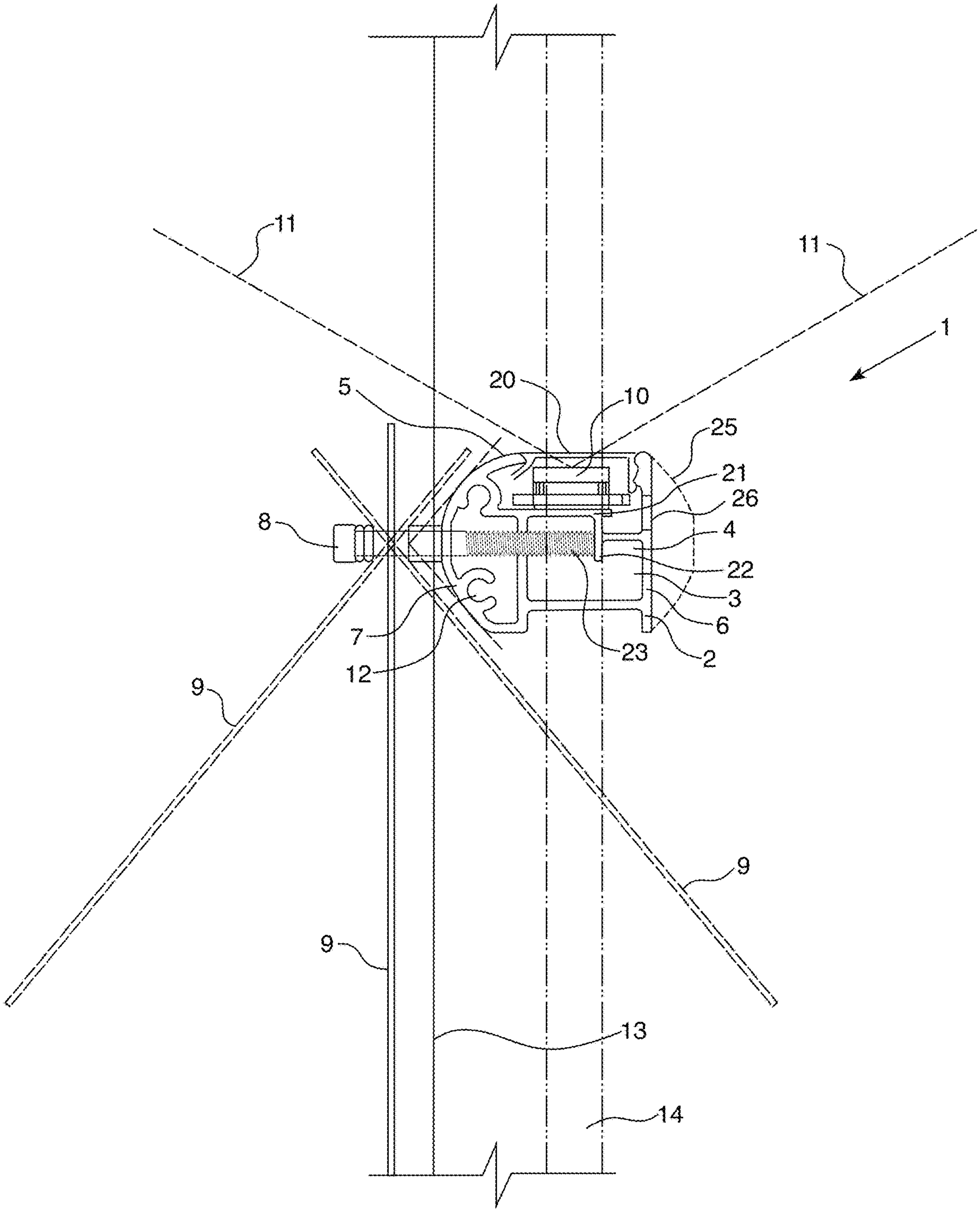
FIG. 1 shows the façade system in cross-section through a vertical plane along one flapper and rung component.

Referencing then FIGS. 1-5, comprehended is a kinetic façade system 1. "Kinetic" here means the system is of the curtainwall type having components designed to move. As it relates to this particular system, the movement is in response to environmental conditions such as wind, i.e. not a mechanical initiation, but rather a wind response. As a “façade system” the invention is designed to attach to a structural wall, typically an exterior building wall to enhance the aesthetics of the building exterior.

A first subassembly of the kinetic façade system 1 includes a rung 2. Although the exact shape of the rung 2 may vary, preferably the rung 2 includes a generally tubular housing 3, “generally” here meaning not exactly cylindrical but somewhat rounded merely for aesthetics and to eliminate sharp edges. The housing 3 therefor has an interior 4, a top 5, a rear wall 6 and a front 7 as shown. The use of these location identifiers along the housing 3 are for lexicography only and would vary depending on orientation of the rung 2, meant merely to distinguish. Important only is that the housing 1 is adapted to attach to a frame-like structure or frame 14. Traditional curtainwall systems include this frame 14, and a plurality of extrusions which span horizontally within the frame 14, anchored at each end to the frame 14, thus this rung 2 can be one of these extrusions. Alternatively, the frame 14 could include pre-existing, horizontal or vertical rails 13, each rail 13 having a rail end 16 (or edge) attached to the frame 14. As such, the rung 1 would attach to a rail 13 instead of being a stand-alone component. “A” as used in the claim means one or more because a curtainwall would in most instances carry multiple, or a plurality of rails 13 and/or rungs 1 which are intermittently spaced and situated in a stacked relation similar to ladder rungs. Accordingly, each rung 2 is adapted to hang in this stacked, “vertical fashion” (as used in the claims) within the frame 14 to form part of the vertical, or upstanding curtainwall.

Figure 2:
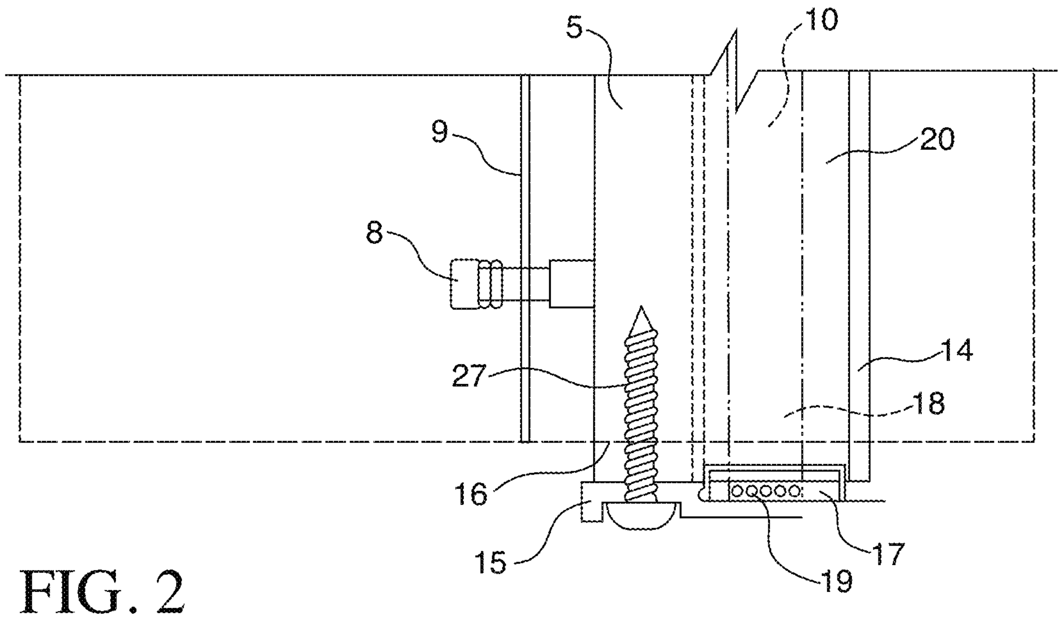
FIG. 2 shows the same rung of FIG. 1 but in a plan view at the end of the rail.

With continued reference to the rung 2, a screw boss 12 is defined within the interior 4 of the housing 3, formed preferably from an integral extrusion extending into the interior 4 as shown. Screw boss 12 receives a screw 27 axially (i.e. relative to axis of tubular housing 3) to thereby fasten rung 2 to frame 14 (or rail end 16). An end extrusion 15 can be utilized to close off the open rail end 16 (or open rung 2 end), in which case the screw 27 would penetrate through end extrusion 15 as shown by FIG. 2 such that the rung 2 is capped off. Additional extrusions formed within interior 4 of housing 12 include an extruded seat 21 and a stop 22. Extruded seat 21 extends integrally from front 7 (which, alternatively may be from an additional screw boss at front 7, so in either case integral to housing 3) generally transaxially (relative to axis of tubular housing 3) as shown, to thereby be in a “generally” horizontal position, here meaning at substantially the same angle as the rung 2 itself. Extending down from extruded seat 21 is arm 24, which supports extruded seat 21 and adds rigidity to housing 3. In this manner, arm 24 is perpendicular to extruded seat 21 in an L-shaped arrangement. Stop 22 is parallel to arm 24 in this embodiment, extending down from extruded seat 21. Stop 22 serves to stop the travel of the pin 8, as further referenced. Of further note is that rear wall 6 may have defined therein a weep hole 26 for water ingress and egress. In addition, a curved profile case 25 somewhat mirroring the front 7 can be attached to the rear wall 6 of the rung 2 for aesthetics and component protection.

The second subassembly to the instant façade system 1 comprises the one or more flappers 9. Flappers 9 can vary in size and shape and be made out of a wide variety of materials like aluminum, acrylic, polycarbonate, PTFE, Kynar film, silicone sheet, rubber sheet, stainless steel, etc. The flappers 9 may vary in shape but are typically square or rectangular. The flappers 9 can be randomly spaced or spaced at equal intervals. Depending on the type of flapper 9, the flapper 9 can be hung on and along rung 2 using different means. First, and as depicted by the figures, a pin 8 is inserted into the flapper 9, then through the front 7 of housing 3 to thereby be pivotably fastened to rung 2, meaning the pin 8 diameter would be small enough to allow the flapper 9 to “hang” at rung 2 such that there is enough give to allow movement of the flapper 9 while concurrently the flapper 9 would maintain engagement with the rung 2. The flapper 9 can be positioned in front of the rung 2 as shown by FIG. 1, or even behind the rung 2, as shown in the alternative embodiment of FIG. 4, which may of course depend on the layout of the curtainwall. As another means to attach the flapper(s) 9, protrusions at the top end of the flappers allow the flappers to be dropped into the frames and pivot (not shown). In either instance, this loose or pivotal engagement of the flappers 9 with the rung 2 (or any flapper support) allows the flapper 9 elements to flap and move in response to the force of wind. The geometry of the flapper support is typically the same for all drop-in or pin-mounted kinetics. Such a geometry allows a forty (40) or forty-five (45) degree movement in each direction (ninety (90) total, although not meant to be limiting), hence “pivotal” attachment. Being wind-driven, the “flapping” wall provides a visual effect along the exterior of any building.

Next, an LED 10 is disposed within the housing 3 of rung 2 positioned near the top 7 thereof situated on seat 21 as shown. The LED 10 is elongate and configured to project light 11 substantially upward. As depicted, this means a ray of light 11 might span a 120° angle above the rung 2, for example. Such a range would inevitably result in reflecting against an upward-residing flapper 9 and rung 2. In one embodiment, the LED 10 is strip-like, RGB-tuneable, white LED with variable intensity. In another embodiment, a lower intensity LED is suitable because it would not throw light on to the supporting structure, and with rectangular flappers 9, gives it a unique, equalizing look as rolling waves of light 11 are created. The top of the rung 2 can include a translucent cap 20 for light diffusion and LED protection. Various types of lights and colors may be employed, even non-LED, so the use of LED is not meant to be limiting as to type of light or bulb, just preferred due to heat, durability and life, thus used as nomenclature only.

Figure 3:
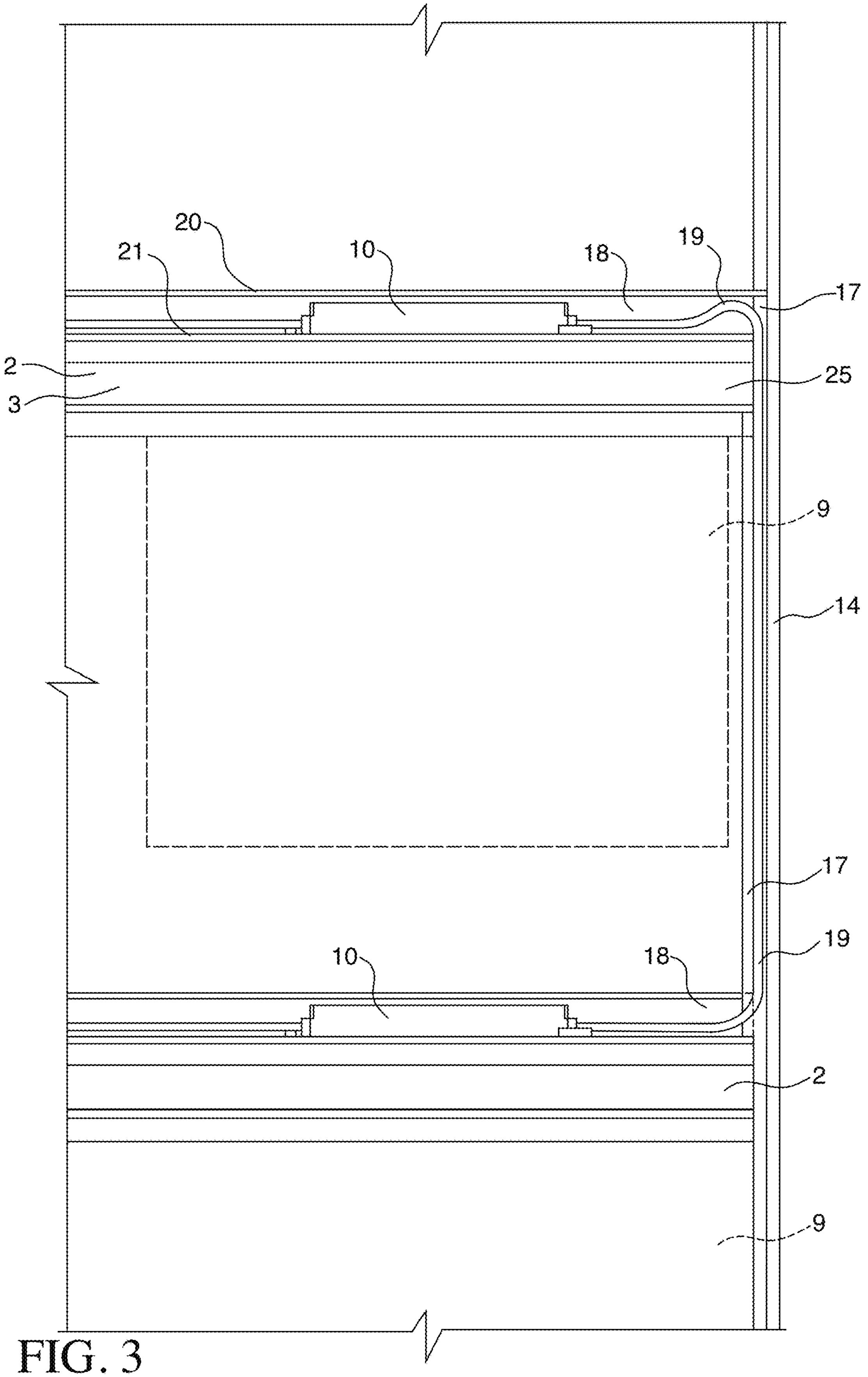
FIG. 3 shows the façade system now with two rungs and in a rear, elevation view.

Now with particular reference to FIGS. 1-3, shown is the wiring 19 to power the façade system 1. End extrusion 15 has a depressed section that defines a pocket 17 when the end extrusion 15 is secured over the end of the rung 2. A wireway 18 is thereby formed/disposed within this pocket 17. The wireway 18 can be a structural sleeve or just the defined location at this end extrusion 15 juncture, thus the wiring 19 of the linear LED 10 terminates at each end of rung 2 and travels through a snap cover-like pocket 17 to power the LED 10. The wiring 19 travels along the frame 14 upward for example to connect to the LED 10 as shown.

Figure 4:
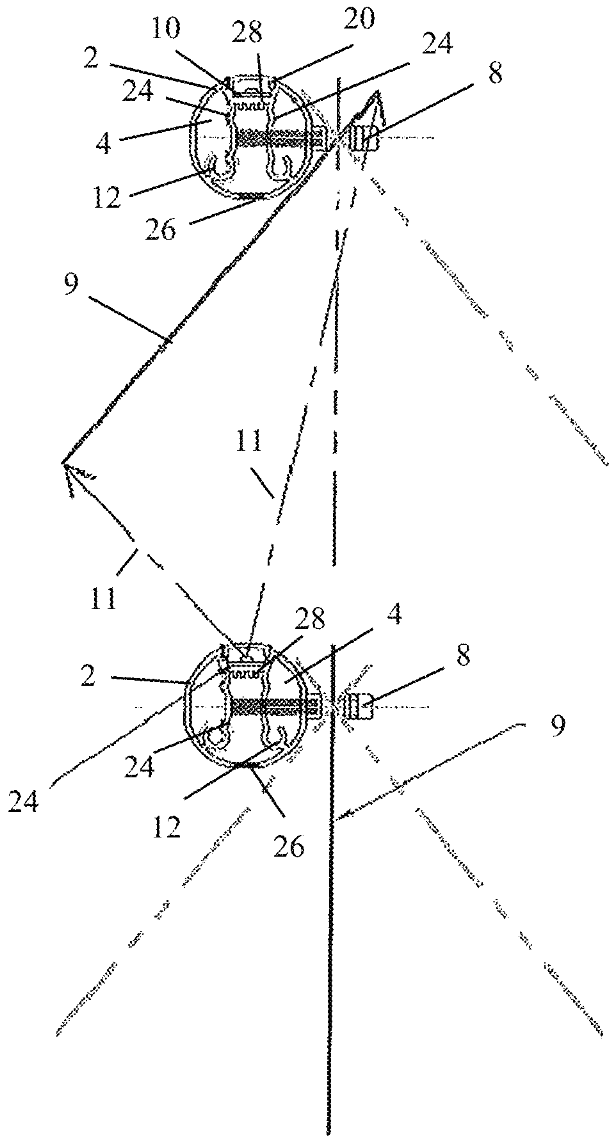
FIG. 4 shows an alternative embodiment of the rungs and flapper components in vertical cross-section.

Referencing now FIG. 4, shown is an alternative embodiment of the rung 2 of the façade system 1 wherein the arms 24 are formed in pairs within the interior 4 of the housing 3 extending downward therein from the top 5. The screw bosses 12 are thus in a varied location from the prior embodiment should structural design require that. In addition, space is provided between the arms 24 to situate a heat sink 28 between the arms 24 to absorb heat should that be desirable. The heat sink 28 can be formed of aluminum and extruded as part of the rung 2. FIG. 4 also shows a good example of how the flapper 9 location may vary in location of attachment along the rung 2, as here, the pin 8 enters at the rear wall 6 instead of the front 7.

Figure 5:
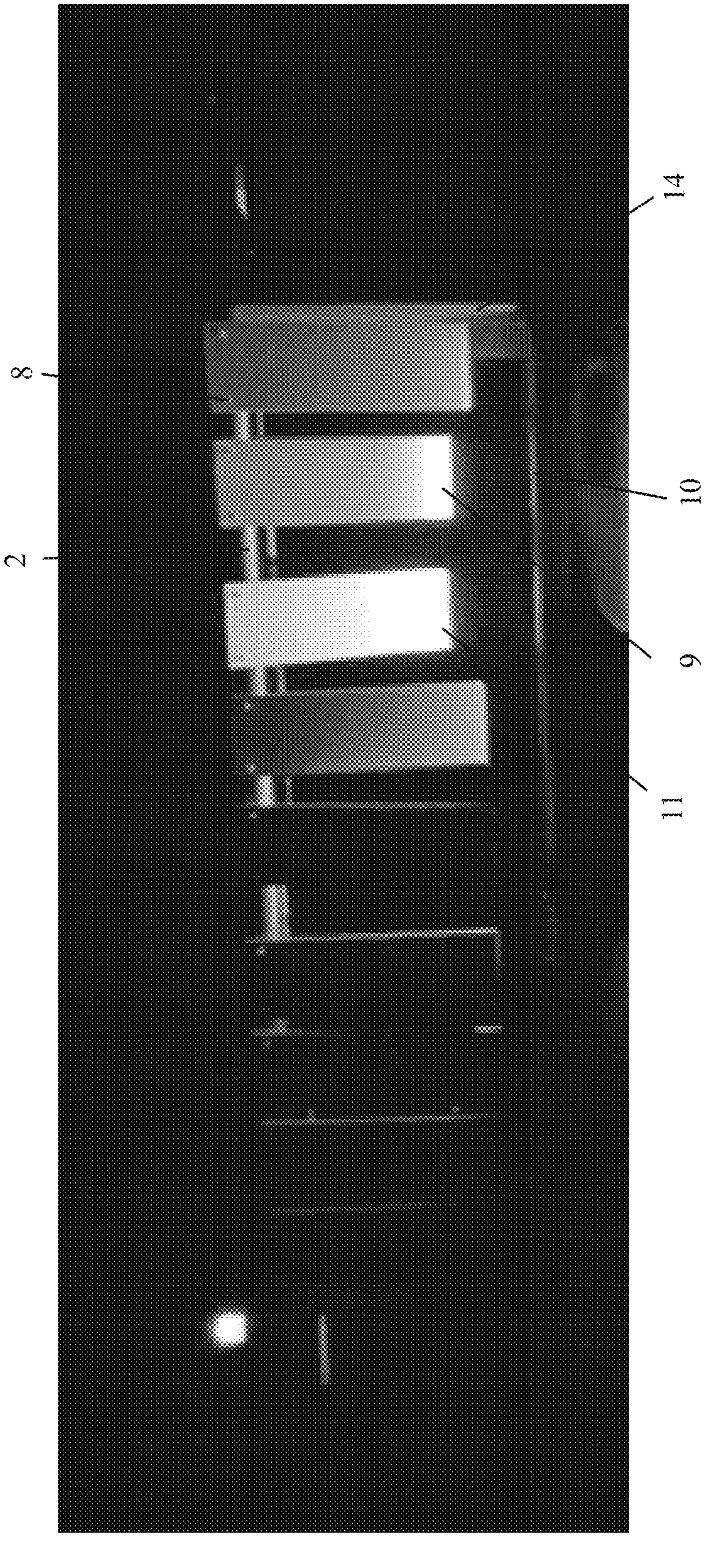
FIG. 5 shows a perspective view of the rung and flapper system showing the projected light along the variably positioned flappers.

In use then, and as depicted by FIG. 5, when a plurality of flapper 9 elements situated above the LED 10 move, the flappers 9 swing through the below-provided light 11 at random intervals and at varying degrees in response to environmental conditions such as win, thereby creating the wave effect at night along the façade of the building.

We claim:

1. A façade system, comprising:

a rung, said rung including a housing having an interior, a top, a rear wall and a front;

a pin for insertion through said front;

a flapper pivotably attached to said rung being held in place at said rung by said pin; and, a light-emitting diode (LED) disposed within said interior of said housing proximate to said top, wherein said LED is configured to project light substantially upward.

2. The façade system of claim 1, further comprising a screw boss defined within said interior of said housing, said screw boss adapted to receive a screw trans-axial to said pin.

3. The façade system of claim 2, further comprising: a rail, wherein said rung is attached to said rail such that said rung can be situated in a generally horizontal position within a frame; and, an extrusion secured to an end of said rail with said screw, said extrusion having defined thereon a pocket.

4. The façade system of claim 3, further comprising: a wireway disposed within said pocket;

and, wiring situated within said wireway with said wiring traveling along said frame up to connect to said LED.

5. The façade system of claim 1, further comprising a cap for securement along said top over said LED.

6. The façade system of claim 1, further comprising an extruded seat within said interior to situate said LED.

7. The façade system of claim 6, further comprising a stop extending perpendicularly from said seat, said stop positioned to stop a pin end of said pin.

8. The façade system of claim 1, further comprising a pair of arms extending downward from said top within said interior of said rung.

9. The façade system of claim 8, further comprising a heat sink between said pair of said arms.

10. The façade system of claim 1, further comprising a curved profile case attached to said rear wall.

11. A façade system, comprising:

a rung, said rung including a tubular housing having an interior, a top, a bottom edge, a rear wall and a front;

a seat in a generally horizontal position within said interior formed integral to said front;

an arm extending generally perpendicular from said seat to said bottom edge to support said seat within said interior;

a flapper attached to said rung; and, a light-emitting diode (LED) disposed on said seat, wherein said LED is configured to project light substantially upward.

12. The façade system of claim 11, further comprising a pin for insertion through said front to secure said flapper.

13. The façade system of claim 11, further comprising a screw boss defined within said interior of said housing, said screw boss adapted to receive a screw.

14. The façade system of claim 13, further comprising: a rail, wherein said rung is attached to said rail such that said rung can be situated in a generally horizontal position within a frame; and, an extrusion secured to an end of said rail with said screw, said extrusion having defined thereon a pocket.

15. The façade system of claim 14, further comprising: a wireway disposed within said pocket; and, wiring situated within said wireway with said wiring traveling along said frame to connect to said LED.

16. The façade system of claim 11, further comprising a cap for securement along said top over said LED.

17. The façade system of claim 11, further comprising a curved profile case attached to said rear wall.

18. A façade system, comprising:

a frame;

multiple rungs, each said rung adapted to hang in vertical fashion within said frame to resemble a side of a building; each said rung including a housing;

one or more flappers, each said flappers pivotably attached along each of said rungs; and, a light-emitting diode (LED) disposed within said housing, wherein said LED is configured to project light substantially upward into a path traveled by another of said flappers.

19. The façade system of claim 18, further comprising: an end extrusion secured to an end of said frame, said extrusion having defined thereon a pocket; a wireway disposed within said pocket; and, wiring situated within said wireway with said wiring traveling along said frame to connect to said LED.

20. The façade system of claim 19, further comprising a curved profile case attached to said rear wall.

* * * * *